Feb. 13, 1968  E. J. HERBENAR ET AL  3,368,852
PIN-TYPE BUSHING ASSEMBLY
Filed Oct. 24, 1965
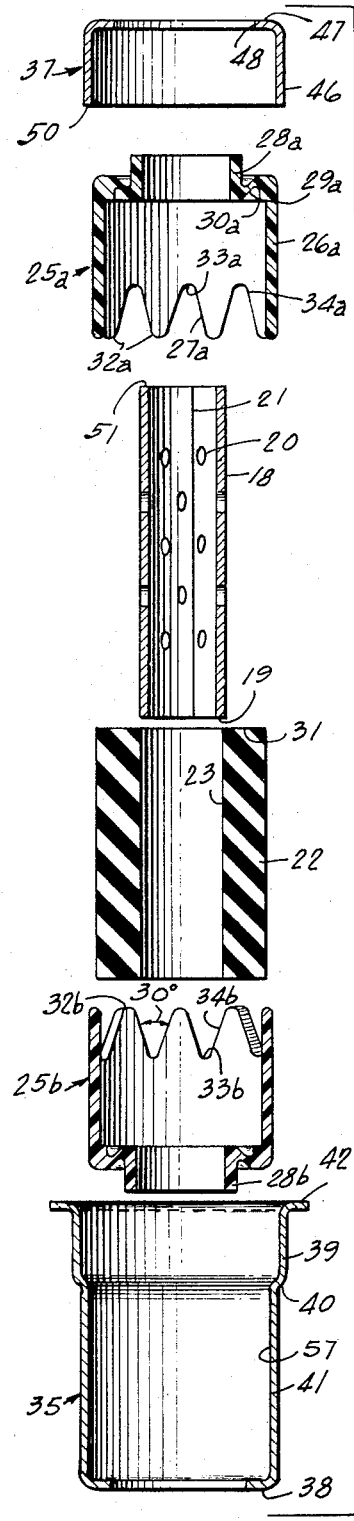
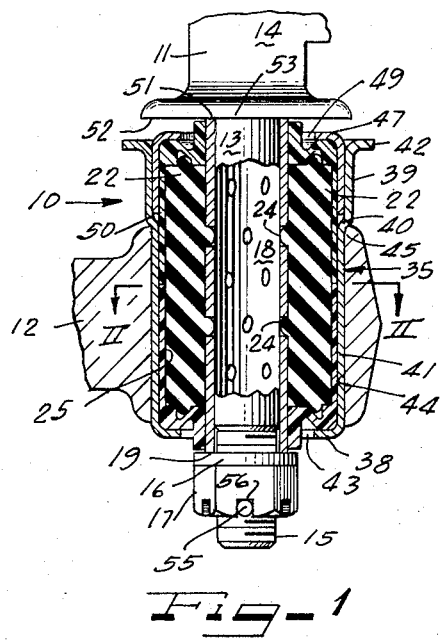
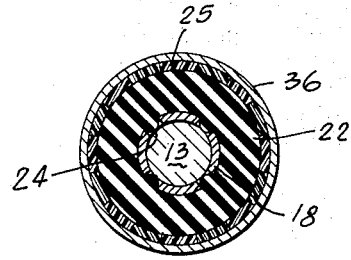
INVENTORS
EDWARD J. HERBENAR
RICHARD CASS
BY *Hill, Sherman, Meroni, Gross & Simpson*  ATTORNEYS United States Patent Office 3,368,852
Patented Feb. 13, 1968

3,368,852
PIN-TYPE BUSHING ASSEMBLY
Edward J. Herbenar, Detroit, and Richard Cass, Birmingham, Mich., assignors to TRW Inc., Cleveland, Ohio, a corporation of Ohio
Filed Oct. 24, 1965, Ser. No. 504,716
10 Claims. (Cl. 308—26)

ABSTRACT OF THE DISCLOSURE

A pin-type bushing assembly of the pre-loaded, self-lubricating type for use in steering mechanisms and in spring-suspended wheel mountings, wherein the joint assembly comprises housing having a cylindrical socket, a pin mounted in the socket for relative rotation with respect thereto, a perforated inner sleeve surrounding the pin and in surface contact therewith, a molded rubber bushing surrounding the inner sleeve, a bearing member in surface contact with the bushing, and a two-part sleeve adapted when the parts are telescoped for assembly to load the bushing and force the material thereof into locking engagement with the perforated inner sleeve, thereby confining the relative rotational movement to the conforming surfaces of the bearing member and the sleeve. The bearing member is made in two parts, with interdigital mating surfaces provided along their confronting ends, whereupon by interlocking the same a unitary bearing member results. The bearing member is preferably formed of a polymeric material, or resin, having self-lubricating properties.

This invention relates to a pin-type bushing assembly and is more particularly directed to a pre-loaded assembly of such construction as to insure relative turning movement between elements of the assembly with a minimum torque requirement. As is well known to those skilled in the art of pin-type joint assemblies for use in automotive vehicles, the self-lubrication of such joints over prolonged years of service with assured safety of continued operation has presented many problems. It is only recently that automotive vehicle manufacturers have found themselves in a position to offer a five-year, or longer, warranty against failure of operation, since there has been no assurance that the heretofore used joint assemblies, such as those employed in the steering mechanisms and in the spring-suspended wheel mountings, could continue to operate satisfactorily and with safety over long periods of time without being properly lubricated at regular, relatively short intervals. The pin-type bushing assembly of our present invention is intended to solve the lubricating and other problems inherent in assemblies as heretofore constructed.

It is, therefore, an important object of this invention to provide an improved pin-type bushing assembly construction having built-in, self-lubricating characteristics that greatly prolong the useful service life of the assembly, that obviate the need of adding lubricant to the joint from time to time, and that eliminate the necessity of close tolerances.

Still other and further objects and features of the present invention will become apparent to those skilled in the art from a consideration of the following specification and the accompanying drawings, wherein:

FIG. 1 is a fragmentary, longitudinal sectional view of a pin-type bushing assembly embodying the principles of our invention;

FIG. 2 is a cross-sectional view taken substantially along the line II—II of FIG. 1, with a part omitted; and FIG. 3 is an exploded view illustrating the elements of the assembly and their relationship to one another.

As shown on the drawings:

As illustrated in FIG. 1, a pin-type bushing assembly, indicated generally by the reference numeral 10, includes a male member 11 and a female member 12. Said members 11 and 12 can, for instance, form elements of joints of the general type used on idler arms, or other linkages, in the steering mechanism of an automotive vehicle, but the bushing assembly 10 has general usefulness wherever a pin or pivot-type of joint with minimum torque requirements and limited angular as well as rotational movement between the male and female elements of the joint is required.

In the finished assembly of FIG. 1, the male member 11 includes a cylindrical pin 13, preferably formed integrally with an arm or link, of which a fragment 14 is illustrated. Said pin 13 is formed of metal or other rigid material of the required tensile and other physical properties. As illustrated, the pin 13 is dependent from the supporting arm 14 and is threaded at its lower end, as at 15, for receiving a washer 16 and a castellated nut 17 for holding the various elements of the assembly in assembled relationship.

A perforated inner sleeve 18 surrounds the pin 13 and is of greater axial extent than the cylindrical surface of said pin 13 so that the lower end 19 thereof will bear against the washer 16 when the nut 17 is threaded home. Said sleeve 18 is provided with perforations 20 for a purpose that will later be apparent. The sleeve 18 is suitably formed from a rectangular blank of metal of proper dimensions, as by rolling the blank to cylindrical form with the longitudinal edges of the rolled blank in abutting relationship to form a closed butt joint, as at 21. This butt joint need not be welded or otherwise bonded to form an integral tubular sleeve.

A bushing 22, preferably of molded rubber or other elastomeric material, surrounds the inner sleeve 18 for the major portion of its length. Said bushing 22 is in the form of a hollow cylinder with its inner cylindrical wall 23 initially of the same, or substantially the same, diameter as the outside diameter of said inner sleeve 18 so as to snugly receive said inner sleeve in the assembling operation. As illustrated in FIG. 1, the material of the bushing 22 is under sufficient load to cause a flow of the material of the bushing into the apertures 20 to interlock therewith, as at 24, and prevent relative rotation between said inner sleeve 18 and the bushing 22.

A two-part bearing member 25 is made up of identical, or substantially identical, parts 25a and 25b (FIG. 3). Since the parts 25a and 25b are substantially identical, only one part 25a will be described and similar reference numerals with the subscript b will be applied to part 25b. The part 25a comprises a thimble-like member having a relatively thin cylindrical wall portion 26a terminating at one end in a sinuous edge 27a and at the other end in a reduced diameter cylindrical neck portion 28a joined to that end of the cylindrical portion 26a by a relatively thinner, flexible connecting portion 29a. Adjacent said reduced end neck portion 28a, the inner wall of said cylindrical portion 26a is provided with an internal annular shoulder 30a. As illustrated in FIG. 3, the inner diameter of the major wall portion 26a is substantially the same as the outer diameter of the bushing 22, so that an end 31 of said bushing abuts against the internal annular shoulder 30a when assembling the elements of the bushing assembly. The sinuous edge 27a of said bearing part 25a is deeply undulating in contour to provide fingers 32a and recesses 33a of the same general contour and dimensions. Consequently, when assembled, the fingers 32a of the bearing part 25a can be fitted into the recesses 33b of the bearing part 25b, and the fingers 32b of the part 25b can be fitted into the recesses 33a of the part 25a, thereby making a substantially unitary bearing member 25 by virtue of the interlocking of the sinuous end edges 27a and 27b.

Said bearing member 25 is preferably formed of a polymeric material, or resin, having self-lubricating properties. By way of example, a synthetic organic plastic having resistance to deterioration and to attack by oils and greases, and having self-lubricating properties, can be used, such as nylon, which is a linear polymeric amide; "Celcon," which is a co-polymer of trioxane; "Delrin," which is an acetal resin; or a polymerized formaldehyde resin; "Marlex," which is a polyethylene; and polyurethanes. In general, a polymer, resin, or other synthetic plastic should be selected that is self-lubricating and has a high degree of flexibility and considerable elasticity, together with high tensile strength, resistance to flow under moderate loading pressures, inertness to oils and greases, or other lubricants, and capable of being molded.

In a commercial form of the two-part bearing member 25, the fingers 32a and the recesses 33a are formed with a radius at their outer and inner ends, respectively, that is the same for both the fingers and the recesses, and the corresponding edges 34a and 34b slope at an angle of substantially 15 degrees to the axis of the bearing member to provide an included angle of approximately 30 degrees, as shown in FIG. 3. By virtue of this construction and the contour of the fingers and recesses, the bearing member parts 25a and 25b readily interlock when assembled, as shown in FIG. 1, to form the effectively unitary bearing member 25, with the cylindrical wall portions 26a and 26b constituting a single, continuous, cylindrical wall surrounding the bushing 22.

An outer cup-like sleeve, indicated generally by the reference numeral 35, formed of thin-walled, rigid material, preferably metal, surrounds the bearing member 25. Said outer sleeve 35, as shown in FIG. 3, is generally cylindrical but formed at its lower end with an inturned annular flange 38 and near its upper end with a relatively short, enlarged cylindrical portion 39 smoothly offset as at 40 from the major cylindrical wall portion 41. Said enlarged wall portion 39 terminates in an outwardly turned radial flange 42. The outer sleeve 35 is suitably formed of a low carbon steel by a drawing or press-punch operation as an integral unit.

As shown in FIG. 1, the outer sleeve 35 snugly receives the bushing 22, with the lower flanged end 38 of the sleeve abutting against the lower end of the bearing member part 25b and freely receiving the downwardly extending neck portion 28b thereof with clearance, as indicated at 43. The sleeve 35, in turn, is snugly and non-rotatably received within the cylindrical socket 44 provided by the female member 12, with the outwardly offset shoulder 40 of said sleeve resting against the upper annular edge 45 of said female member 12.

The upper part 37 that cooperates with the sleeve 36 is in the nature of a cap, being formed with a longitudinally extending, short cylindrical wall 46 (FIG. 3). Said cap member 37 includes at its upper end a radially inturned flange 47 providing an opening 48 of greater diameter than the upper neck portion 28a of the bearing member part 25a, thereby providing a clearance therebetween, as at 49 (FIG. 1). The outside diameter of the cap 37 is slightly greater than the inside diameter of the cylindrical portion 39 of said sleeve 36, whereby when the cap 37 is forced into the interior of the upper cylindrical wall portion 39, end-wise pressure is placed upon the bushing 22 through the medium of the bearing member part 25a. The length of the cylindrical wall 46 of the cap member 37 is somewhat less than the length of the enlarged wall portion 39 of the outer sleeve 36, with the result that the end 50 of the cap member 37 terminates just short of the inner surface of the offset portion 40 of said outer sleeve. By reason of this construction, and the pressure-fit relationship between the cap member 37 and the enlarged wall portion 39 of the outer sleeve 36, the act of assembling the outer sleeve and cap in place, as shown in FIG. 1, results in the loading of the bushing 22, as above indicated.

The order of assembling the various component parts of the final assembly will be apparent from an inspection of FIG. 3. A sub-assembly of the cap member 37 and the upper bearing member part 25a is inserted over the upper end (as shown) of the bushing 22 and the inner sleeve 18. Next, this sub-assembly is then mounted on the pin 13 until the upper end of the inner sleeve 18 abuts against the planar surface 51 and the bushing 22 abuts against the inturned shoulder 30a of the bearing member part 25a. The lower part 25b of the bearing 25 is next inserted over the other end of the bushing 22 and rotated, if necessary, until the fingers and recesses of the bearing part 25b interfit with the recesses and fingers of the bearing part 25a. Thereafter, the outer sleeve 35 is inserted over the now unitary bearing member 25 and forced therealong until a pressure-fit relationship has been established between the outer surface of the cap member 37 and the inner surface of the enlarged cylindrical portion 39 of the sleeve 36. The pressure-fit relationship is carried out to the extent required to produce the desired amount of preloading upon the bushing 22. Such preloading, as already stated, is the result of the end pressure exerted upon the bushing 22 by reason of the relative drawing together of the end flanges 47 and 38 when the outer sleeve 35 and cap member 37 are assembled in the manner already described.

As a final step of the assembly, the washer 16 is placed against the lower end 19 of the inner perforated sleeve 18, the castellated nut 17 is threaded home against said washer 16, and, finally, a retaining pin 55 is positioned in one of the transverse holes (not shown) in the threaded end 15 of the pin 13 to lie within a pair of the notches 56 in the castellated nut 17. The resulting assembly is then fitted into the socket 44 of the female member 12 by relative movement axially of the pin 13. Due to the close-fit relationship between the outer surface of the outer sleeve 35 and the inner surface 44 of the socket bore 41, the resulting contacting surfaces are in sufficient frictional engagement to prevent relative rotation therebetween.

Thus, the female member 12 and the outer sleeve 36 and cap member 37 are all in relative non-rotational engagement to constitute one element, in effect, of the female part of the joint. Due to the flow of the material of the bushing 22 through the apertures 24 into contact with the pin 13, the bushing 22 is locked against relative rotation with respect to said pin 13 and together, the pin 13, inner perforated sleeve 24 and bushing 22 constitute what is in effect the male member of the joint. By reason of the frictional engagement between the outer surface of the elastomeric bushing 22 and the inner surface of the bearing member 25, there is no relative rotation between those surfaces, with the result that the entire relative rotational movement between the male and female members of the joint is that between contacting portions of the outer surface of the bearing member 25 and the inner surface 57 of the outer sleeve 35, and between the contacting portions of the outer surface of the bearing member 25 and the inner surface of the cap member 37.

Since the bearing member 25 is of a self-lubricating synthetic organic plastic material, no lubricant need be added for lubricating these relatively rotatable surfaces, although a lubricant can be impregnated into the bearing 25 or can be coated over its outer surface prior to assembly of the component parts of the bushing assembly.

It will be appreciated from the foregoing description that none of the surfaces of the component parts of the final assembly 10 need be machined to close tolerances since the only relative rotational movement is between the bearing 25 formed of a self-lubricating synthetic organic plastic and the inner surfaces provided by the outer sleeve 35 and the end cap 37. Relative rotational movement as well as limited tilting or angular movement is provided for with a minimum of frictional resistance to such movements between the surfaces involved, owing primarily to the self-lubricating properties of the bearing member. The degree to which the elastomeric bushing 22 is pre-loaded, can easily be varied to suit the torque and other requirements of the joint assembly. This is accomplished by the extent of end-wise compression placed upon the bushing by the assembly of the outer sleeve 35 and the cap member 37.

The term "self-lubricating" is applied herein to those materials that inherently exhibit an unusually low coefficient of friction.

It will be apparent to those skilled in the art that variations may be undertaken without departing from the novel concepts of the present invention, and in view thereof, it is our intention that the scope of the present invention be limited solely to the scope of the hereinafter appended claims.

We claim:

1. A joint assembly comprising:
    a housing providing a cylindrical socket,
    a pin within said socket for relative rotation with respect to said housing,
    a perforated inner sleeve surrounding said pin and in surface contact therewith,
    a bushing of elastomeric material surrounding said inner sleeve,
    a two-part telescopic bearing member in surface contact with both the peripheral and end surfaces of said bushing,
    an outer sleeve of rigid material between said housing and said bearing member and in conforming peripheral and end surface contact with said bearing member, and means telescopically cooperating with said outer sleeve and said bearing member placing an end-wise load on said bushing to force the material thereof into locking engagement with said perforated inner sleeve and thereby to confine the relative rotational movement to the conforming surfaces of said bearing member and outer sleeve.

2. A joint assembly as defined by claim 1, wherein, said means is a cap-like member in pressure-fit relationship to said outer sleeve and bearing member at an end thereof.

3. A joint assembly as defined by claim 1, wherein, said bearing member is in two parts having interfitting axially directed portions and constricted open-ended outer portions receiving the ends of said inner sleeve.

4. A joint assembly as defined by claim 3, wherein, said bearing member is formed of plastic having self-lubricating properties.

5. A joint assembly as defined by claim 2, wherein, said outer sleeve has a reduced diameter cylindrical portion snugly enclosing said bearing member and a larger diameter portion for receiving said cap-like member in end-wise pressure-fit relationship to pre-load said bushing.

6. A joint assembly as defined by claim 1, wherein, said bearing member is of plastic and in two similar parts,
    each of said parts having a reduced diameter end portion enclosing and abutting against an end of said bushing and having an axially extending axially directed serrated end for confronting and interfitting relation with that of the other part to prevent relative rotation of said parts.

7. A joint assembly as defined by claim 2, wherein, said pin, inner sleeve, bushing, bearing member, outer sleeve and said cap-like member are all assembled in coaxial, telescoping relationship and said bushing is axially loaded to provide a predetermined amount of resistance to relative rotation between the said conforming surfaces.

8. A joint assembly as defined by claim 7, wherein, said bushing is formed of rubber, and
    said bearing member is formed of a self-lubricating, synthetic organic plastic.

9. A joint assembly as defined by claim 8, wherein, said outer sleeve is formed with an enlarged cylindrical end portion of slightly lesser inside diameter than the outer diameter of said cap-like member and said cap-like member is in pressure-fitted relationship in said enlarged cylindrical end portion to effect loading of said bushing.

10. A joint assembly as defined by claim 9, wherein, said pin, inner sleeve, bushing, outer sleeve, bearing member and said cap-like member are all in an assembled coaxial, telescoping relationship, and
    said outer sleeve and cap-like member are in pressure-fit relationship and together effect an end-wise pressure on said bushing to pre-load the same.

References Cited
UNITED STATES PATENTS

| | | | |
|---|---|---|---|
| 1,940,302 | 12/1933 | Humphrey | 287—85 X |
| 2,380,715 | 7/1945 | Aker | 308—238 |
| 2,562,359 | 7/1951 | Iredell | 287—85 X |
| 2,868,571 | 1/1959 | Owen | 287—85 |
| 3,010,746 | 11/1961 | Melton | 287—85 |
| 3,039,831 | 6/1962 | Thomas | 308—26 |
| 3,139,311 | 6/1964 | Melton | 308—238 |
| 3,188,152 | 6/1965 | Miller | 308—36.1 |
| 3,202,410 | 8/1965 | Schell | 287—85 X |
| 3,239,286 | 3/1966 | Harrison | 308—26 |
| 3,300,257 | 1/1967 | Selker | 308—36.1 |

FOREIGN PATENTS

| | | |
|---|---|---|
| 1,086,079 | 2/1955 | France. |

MARTIN P. SCHWADRON, *Primary Examiner.*

L. L. JOHNSON, *Assistant Examiner.*